(12) United States Patent
Edye et al.

(10) Patent No.: US 10,544,545 B2
(45) Date of Patent: Jan. 28, 2020

(54) LIGNIN-BASED WATERPROOF COATING

(71) Applicant: Queensland University of Technology, Queensland (AU)

(72) Inventors: Leslie Alan Edye, Queensland (AU); Albert John Tietz, Queensland (AU)

(73) Assignee: QUEENSLAND UNIVERSITY OF TECHNOLOGY, Brisbane, Queensland (AU)

(*) Notice: Subject to any disclaimer, the term of this patent is extended or adjusted under 35 U.S.C. 154(b) by 0 days.

(21) Appl. No.: 15/029,020

(22) PCT Filed: Oct. 20, 2014

(86) PCT No.: PCT/AU2014/000987
§ 371 (c)(1),
(2) Date: Apr. 13, 2016

(87) PCT Pub. No.: WO2015/054736
PCT Pub. Date: Apr. 23, 2015

(65) Prior Publication Data
US 2016/0258113 A1  Sep. 8, 2016

(30) Foreign Application Priority Data
Oct. 18, 2013  (AU) ................................ 2013904015

(51) Int. Cl.
| | | |
|---|---|---|
| *D21H 21/16* | (2006.01) |
| *D21H 25/02* | (2006.01) |
| *D21H 25/06* | (2006.01) |
| *D21H 19/14* | (2006.01) |
| *C09D 197/00* | (2006.01) |
| *D21H 23/22* | (2006.01) |

(52) U.S. Cl.
CPC ......... *D21H 21/16* (2013.01); *C09D 197/005* (2013.01); *D21H 19/14* (2013.01); *D21H 23/22* (2013.01); *D21H 25/02* (2013.01); *D21H 25/06* (2013.01)

(58) Field of Classification Search
CPC combination set(s) only.
See application file for complete search history.

(56) References Cited

U.S. PATENT DOCUMENTS

| | | | |
|---|---|---|---|
| 1,899,526 A | 2/1933 | Phillips | |
| 2,242,601 A | 5/1941 | Wallace | |
| 2,703,293 A * | 3/1955 | Boehm | ..................... D21J 1/08 106/123.12 |
| 6,217,942 B1 * | 4/2001 | Bolle | ................. C09D 197/005 427/385.5 |
| 2002/0084045 A1 * | 7/2002 | Collias | ................... D21H 17/23 162/16 |
| 2010/0166968 A1 * | 7/2010 | Doherty | ................. D21H 17/23 427/387 |
| 2011/0190402 A1 * | 8/2011 | Linhardt | ................ A01N 25/00 514/781 |

FOREIGN PATENT DOCUMENTS

| | | |
|---|---|---|
| EP | 2014829 | 1/2009 |
| RU | 2076125 | 3/1997 |
| WO | WO9747702 | 12/1997 |
| WO | WO0028141 | 5/2000 |

* cited by examiner

*Primary Examiner* — Nathan H Empie
(74) *Attorney, Agent, or Firm* — Hoffman & Baron, LLP (57) ABSTRACT

A method of forming a coating on a substrate is provided comprising forming a lignin solution by at least partially dissolving lignin in a solvent, coating the lignin solution onto the substrate and exposing the lignin coated substrate to a treatment selected from the group consisting of a heat treatment and an acid treatment. The coating provides for improved waterproofing and/or strengthening of the substrate.

19 Claims, 4 Drawing Sheets

LIGNIN-BASED WATERPROOF COATING

CROSS-REFERENCE TO RELATED APPLICATIONS

This application is a U.S. National Phase Application of International Application No. PCT/AU2014/000987 filed on Oct. 20, 2014 and asserts priority to Australian Patent Application No. 2013904015 filed on Oct. 18, 2013, all of which are hereby incorporated by reference in their entirety.

FIELD OF THE INVENTION

The invention relates to the field of coating technologies. More particularly, this invention relates to a method of forming a waterproof coating on a substrate and to compositions for use therein.

BACKGROUND TO THE INVENTION

Any reference to background art herein is not to be construed as an admission that such art constitutes common general knowledge in Australia or elsewhere.

The use of waterproof coatings on a range of substrates is common in a wide range of applications. One example is the waterproofing of paper and paperboard products used in the food packaging and transportation industries. It is important in these applications to protect the food from the ingress of moisture which may affect the quality of the food or even cause spoiling. Waterproof coatings also preserve the packaging's structural integrity in high moisture environments.

Existing waterproof coatings of card and corrugated paper packaging are often made from wax which may provide an effective barrier to water but which are difficult to recycle. Other waterproof coatings are known which contain a range of polymeric hydrophobic components along with fillers and the like. These fillers and other agents are typically required to place the paper substrate into a suitable state for attachment of the actual waterproofing agent. This requires a delicate balance in the formulation whereby pH and temperature conditions are optimal for all of the individual components to exert their effect.

These fillers and other preparatory agents are often less than satisfactory in their performance and overall the coating formulations become complicated in terms of the number of components required to achieve the effect. The presence of these multi-functional components also increases the cost to the consumer.

WO 2000/028141 teaches a composition and method for treating paper products with a ligninosulfonate/kraft lignin blend formulation in a mixture of solvents to improve strength and humidity resistance, described as the preservation of strength in a high humidity environment. The process relies on penetration of the formulation into the paper to bond the fibres together with optional use of sugars to help penetration of the lignin and optional heating. WO 2000/028141 does not provide for water barrier properties even though some incidental improvement in initial water resistance is observed. It also requires very high coating weights of formulation to achieve adequate penetration and has a significant amount of undissolved solids in the formulation which is undesirable.

RU2076125 (Dejneko) generates an oxidised lignin and then employs this as a binder for wood fibres which undergo a hot pressing to form the final particle board. While some water resistance is claimed this process primarily employs lignin as a binder and does not result in a useful water barrier. It also relies on unnecessarily complicated pre-treatment steps for the lignin.

It would be useful to provide for a method of forming a waterproof coating on a substrate, including a paper or a paper product, which is simple, effective and recyclable.

OBJECT OF THE INVENTION

It is an aim of this invention to provide for a waterproof coating for a substrate which overcomes or ameliorates one or more of the disadvantages or problems described above, or which at least provides a useful alternative.

Other preferred objects of the present invention will become apparent from the following description.

SUMMARY OF INVENTION

According to a first aspect of the invention, there is provided a method of forming a coating on a substrate including the steps of:
   (a) forming a lignin solution by at least partially dissolving a lignin in a solvent;
   (b) coating the lignin solution onto the substrate, and
   (c) exposing the lignin coated substrate to a treatment selected from the group consisting of a heat treatment and an acid treatment,
   to thereby form the coating on the substrate.

Preferably, the lignin is obtained from soda, soda-anthraquinone, organsolv pulping liquors, Kraft black liquor, lignocellulosics or lignin containing biomass materials from any plant origin. Lignosulfonates recovered from the spent pulping liquids (red or brown liquor) of sulfite pulping may be useful but are less preferred. Lignin-based compounds obtained by chemical modification of lignins sourced from pulping and separation processes, for example the removal of sulfonate groups form lignosulfonates, may also be used.

The lignin solution comprises lignin as the major waterproofing agent. In one embodiment, the lignin solution consists essentially of lignin as the active waterproofing agent. In one embodiment, the lignin solution comprises lignin as the sole waterproofing agent.

The lignin solution comprises lignin as the major strength enhancing agent. In one embodiment, the lignin solution consists essentially of lignin as the active strength enhancing agent. In one embodiment, the lignin solution comprises lignin as the sole strength enhancing agent In one embodiment, the lignin solution substantially comprises lignin as the only non-solvent component.

A second aspect of the invention resides in a composition which comprises lignin, as the major active component, at least partially dissolved in a solvent.

In one embodiment, the lignin is substantially completely dissolved in the solvent.

The composition may be as described for the first aspect. Preferably, the solvent is such that an alkaline solution is formed.

In one embodiment, the composition consists essentially of lignin, as the active component.

In a further embodiment, the composition consists of lignin, as the active component.

The composition may further comprise a deodorising agent and/or a plasticiser, as described for the first aspect.

According to a third aspect of the invention there is provided a use of the composition of the second aspect to form a coating on a substrate.

The use will be as described in each statement made in relation to the first aspect as if each of those statements was recited explicitly for the third aspect.

A fourth aspect of the invention resides in a substrate comprising a coating formed by the method of the first aspect.

The substrate may be as described for the first aspect.

The various features and embodiments of the present invention, referred to in individual sections above apply, as appropriate, to other sections, mutatis mutandis. Consequently features specified in one section may be combined with features specified in other sections as appropriate.

Further features and advantages of the present invention will become apparent from the following detailed description.

BRIEF DESCRIPTION OF THE DRAWINGS

In order that the invention may be readily understood and put into practical effect, preferred embodiments will now be described by way of example with reference to the accompanying figures wherein.

DETAILED DESCRIPTION OF THE DRAWINGS

The present invention is predicated, at least in part, on the finding that a highly effective waterproof and/or strengthening coating can be formed on paper by, in certain embodiments, coating the paper with a simple solution of lignin. In further embodiments, the coating can be formed with lignin and glycerol. The coated lignin is then subjected to either a thermal annealing step or to an acid treatment step. Both of these steps result in a transformation of the lignin coating, when dried, to form a glossy shiny coating which shows commercially useful levels of water resistance. It has not been appreciated in the art that such an effective waterproof and/or strengthening coating could be achieved using lignin as the major or sole active waterproofing and strengthening agent.

Unless defined otherwise, all technical and scientific terms used herein have the same meaning as would be commonly understood by those of ordinary skill in the art to which this invention belongs.

As used herein, the term "lignin" refers generally to lignin-based compounds or oligomers/polymers that are insoluble or only sparingly soluble in water but for the major part soluble in aqueous alkaline or, at least partially soluble in mildly acidic solutions. Lignosulfonates may also be used in the present process, with modifications, but are less preferred. Oxidised lignins are also less preferred.

As used herein, the term "waterproof" or "waterproofing" is synonymous with "water-resistant" and is used to indicate an improvement in the waterproof or water-resistant properties of the substrate to which the lignin coating is applied. These terms are not to be restricted to requiring that the coating forms a water impermeable barrier under all conditions.

In one embodiment, the term "waterproof" or "waterproofing" is used to indicate that the coating, after appropriate heat or acid treatment, forms a barrier which substantially prevents the ingress of water into the substrate in an industry standard Cobb 30 test when the substrate is contacted with liquid water.

The phrase "active waterproofing agent", as used herein, refers to a component of a solution, composition or formulation which, after the appropriate coating and post-coating treatment steps, actively forms a barrier to resist the ingress of water into the substrate.

As used herein, the term "strengthening" refers to an increase in the physical strength and/or resilience of the substrate after the coating of the invention has been formed and treated therein compared with those characteristics of the substrate prior to coating. The increase in strength can be determined by standard industry means such as, for example, ring crush testing performed according to set international standards.

The phrase "consists essentially of", as used herein, means that the element or component which follows forms the main active in the solution, composition, formulation or coating. In particular it is used to mean that the element or component which follows forms greater than 50%, 60%, 70%, 75%, 80%, 85%, 90%, 95%, 96%, 97%, 98% or 99% by weight of the active waterproofing and/or strength enhancing agents. In one embodiment, the phrase is used to mean that the element or component which follows is the only active waterproofing and/or strength enhancing agent and any other elements or components which are present, such as deodorizing agents or plasticisers, are not active waterproofing and/or strength enhancing components. It is preferred that the waterproof and/or strengthening capability of the final coating is substantially provided by lignin alone.

The phrase "consists of", as used herein, means that the element or component which follows is the only active waterproofing and/or strength enhacing component in the solution, composition, formulation or coating. Other non-solvent elements or components may only be present in trace amounts.

In a first aspect of the invention, there is provided a method of forming a coating on a substrate including the steps of:

(a) forming a lignin solution by at least partially dissolving a lignin in a solvent;

(b) coating the lignin solution onto the substrate; and (c) exposing the lignin coated substrate to a treatment selected from the group consisting of a heat treatment and an acid treatment, to thereby form the coating on the substrate.

In one embodiment, the coating is a waterproof coating.

In one embodiment, the coating is a water resistant coating.

In one embodiment, the coating is a strengthening coating.

In one embodiment, the substrate is selected from the group consisting of lignocellulosic substrates, lignocellulosic derived substrates, cellulosic substrates and cellulosic derived substrates.

Suitably, the substrate is selected from the group consisting of a paper or a paper product, a wood or wood veneer, a cotton or other natural fibre fabric, moulded pulp and moulded fibre materials, sugar cane bagasse-based materials, tapioca-based materials, corn starch-based materials and biomass composite materials. A range of paper and paper products, such as paperboard, can be coated with the lignin compositions of the present inventions. Any paper-based substrate which is required to have water-resistant or improved physical strength characteristics could be coated in accordance with the present invention and such substrates would be well known to those in the art.

The substrate is a non-metal substrate.

Preferably, the substrate is a formed substrate prior to coating by which it is intended that the coating is not applied during manufacture or formation of the substrate when the physical components of the substrate have not yet been bound together. In the case of paper or moulded wood fibre products, by way of example, this means that the coating is applied to the fully formed substrate rather than being integrated into the fibres prior to moulding to act as a binder. The fully formed substrate refers to the product or sheet onto which the coating is applied and it will be appreciated that this substrate itself may then become internalised as part of a larger complex product. The present coatings thus substantially sit on top of the formed substrate and do not penetrate internally to any significant degree to impart the waterproofing and/or strengthening properties. The formed substrate includes a substrate, such as a paper substrate, which has not yet undergone converting operations but is still considered to be a formed substrate.

Thus, in one embodiment, the coating step is a coating of the lignin solution onto substantially only an external surface of the substrate. The coating is not performed on any element of the substrate which will become an internal part of the formed substrate. In one embodiment, the method is a method of forming a coating which remains on substantially only an external surface of the substrate. For the sake of clarity, and as mentioned above, the substrate which has the coating sitting on an external surface thereof (and not internalised within to any significant extent) may become an internal part of a larger product but the coating still only sits on the surface of the substrate onto which it was actually coated. For example, a cardboard substrate may be coated on one side and the carboard then used as an outer wall of a corrugated cardboard product having at least two outer walls and an inner fluted layer. The coated side of the substrate may be positioned to face internally into the fluted layer. Thus, while the substrate itself has a coated layer facing internally into a larger product the coating of the present invention does not to any substantial extent become internalised within the substrate per se.

The solution may be a mildly acidic, neutral or alkaline solution. Preferably, the lignin solution is an alkaline lignin solution. The alkaline solution may be an ammonia solution, an alkali metal hydroxide or carbonate solution or an alkaline earth metal hydroxide or carbonate solution. Preferred alkaline solutions will be those which are volatile and so are easily removed from the coating with minimal or no residue left behind to potentially interfere with the coating.

Preferably, the solvent is an aqueous ammonia solution. Ammonia has proven to be particularly effective in dissolving the lignin to form an appropriate solution for coating. Further, ammonia is volatile and so it does not leave a problematic residue on drying. However, any alkaline solution which is capable of dissolving the lignin within a reasonable volume and subsequently being easily removed may be appropriate. Alkalis which may damage the substrate or which will leave a salt residue upon evaporation which may interfere with the waterproof and/or strength enhancing coating are to be avoided.

Preferably, the lignin is obtained by separation, for example by acidification, from soda, soda-anthraquinone or organosolv pulping liquors. The lignin can also be obtained by known methods of extraction from lignocellulosics or lignin containing biomass materials from any plant origin. Lignin obtained by separation, for example by acidification, from Kraft black liquor may also be used. Lignosulfonates recovered from the spent pulping liquids (red or brown liquor) of sulfite pulping may be useful but are less preferred. Lignin-based compounds obtained by chemical modification of lignins sourced from pulping processes, for example the removal of sulfonate groups form lignosulfonates, may also be used.

In one embodiment the lignin is a natural, unmodified or non-derivatised lignin.

In one preferred embodiment, the lignin is a soda pulp lignin.

In one embodiment, the lignin is not an oxidised lignin.

In one embodiment, the lignin is not a lignosulfonate lignin.

The lignin solution comprises lignin as the major waterproofing and/or strengthening agent. In one embodiment, the lignin solution consists essentially of lignin as the active waterproofing and/or strengthening agent. In one embodiment, the lignin solution comprises lignin as the sole waterproofing and/or strengthening agent.

This is a key difference between the present coating compositions and those of the prior art. Some prior art coating compositions may use lignin as one of the components but it is always in combination with other active agents including fillers and waterproofing agents of different classes. Indeed, most often the lignin which is present in these compositions is not actually there because of any inherent waterproofing or strengthening properties but rather is itself acting as a filler. In contrast, the present inventors have discovered that an extremely effective waterproof barrier and/or a consequent increase in the physical strength of the substrate can be formed using a composition in which lignin is the only active waterproofing and strengthening agent. In fact, other than optional deodorising treatments, which may be required to address any inherent odour from the lignin, and very small amounts of optional plasticisers, lignin may be the only component which is present in the compositions.

In one embodiment, the lignin solution substantially comprises lignin as the only non-solvent component. This is the simplest form of the present waterproofing and/or strengthening compositions wherein lignin is dissolved in a solvent, preferably in an ammonia solution. No further agents or additives are required for this to be an effective coating once it has been suitably thermally annealed or exposed to a pH reduction (acid treatment).

It is an advantage of the present invention that only lignin is used as the active waterproofing and/or strengthening agent and so the coating treatment relies on renewable resources and is entirely and easily recyclable.

In one embodiment, the lignin solution substantially comprises lignin as the only non-solvent component.

It is an advantage of the present invention that the use of, particularly, an ammonia solution results in substantially complete dissolution of the lignin. In WO 00/28141 the use of a mixed solvent to address the varying solubilities of the lignins used, particularly at the higher lignin/solvent ratios, means the lignin is only partly dissolved and a considerable portion of the lignin is present as a particulate suspension. In the present lignin solution the lignin is substantially completely or predominately dissolved thereby providing for an improved finish in the dried coating. In one embodiment, the lignin is substantially completely dissolved in the solvent.

In one embodiment, the lignin solution, prior to coating, has an undissolved solids content of less than 5% 4%, 3%, 2%, 1.0%, 0.5%. 0.25% or 0.1% by weight of the solution.

In an embodiment, the lignin solution may comprise, in a % by weight of the solution amount, lignin in between 10 to 40%, 10 to 35%, 10 to 30%, 10 to 25%, 15 to 40%, 15 to 35%, 15 to 30% or 15 to 25%, inclusive of about 16, 17 18, 19, 20 21, 22, 23 or 24%.

In one embodiment, the lignin solution may further comprise an agent selected from the group consisting of sugars and sugar alcohols. Sugars may be selected from the group consisting of monosaccharides, disaccharides and polysaccharide sugars. Sucrose is one favoured example of a disaccharide but a wide range of such sugars are known to those skilled in the art. In one embodiment the sugar alcohol is a polyol is selected from the group consisting of ethylene glycol, glycerol, erythritol, threitol, arabitol, xylitol, ribitol, mannitol, sorbitol, galactitol, fucitol, iditol, inositol, volemitol, isomalt, maltitol and lactitol.

In one embodiment, the lignin solution may further comprise a $C_2$ to $C_{12}$ polyol, This is inclusive of $C_2$ to $C_{12}$, $C_2$ to $C_{10}$, $C_2$ to $C_8$, $C_2$ to $C_6$, $C_2$ to $C_4$, $C_3$ to $C_{12}$, $C_3$ to $C_{10}$, $C_3$ to $C_8$, $C_3$ to $C_6$, inclusive of $C_2$, $C_3$, $C_4$, $C_5$ and $C_6$ polyols.

In a preferred embodiment, the polyol is glycerol. It has been found that the use of glycerol, above a certain % by weight amount, surprisingly allows the annealing temperature employed in the heat treatment step to be significantly reduced compared to that required after coating with a solution containing lignin alone to achieve the same water barrier and/or strengthening efficacy. This is counterintuitive as, although glycerol may be used as a plasticiser in small amounts in certain applications, it would be expected that higher levels of glycerol would actually increase water absorption due to the presence of multiple hydroxyl groups. It would also be expected that higher levels of glycerol would result in a coating which would be greasy to the touch and easily removed and hence reduce any gains in physical strength of the substrate. The present inventors have found this is not the case and while the addition of glycerol is not essential it has benefits in reducing the required annealing temperature and providing for an improved water resistant and/or strengthening coating.

While not wishing to be bound by any particular theory, the inventors postulate that upon heating some of the glycerol reacts with ammonia to form amides. These amides are more volatile than glycerol itself and depending on the temperature at the paper surface may decompose. The formation of the amides and their subsequent decomposition are exothermic reactions which serve to increase the temperature at the paper surface. The reaction with ammonia also decreases the pH and drives the glass transition event in the same manner as acid annealing and higher temperature annealing do.

The polyol, preferably glycerol, may be present in a % by weight amount of the lignin solution of between 0.1 to 35%, including 0.1 to 30%, 0.1 to 25% and 0.1 to 20%. In one embodiment, the polyol, preferably glycerol, is present at 1 to 35%, including 1 to 30%, 1 to 25% and 1 to 20% or 5 to 35%, including 5 to 30%, 5 to 25% and 8 to 20% or 8 to 35%, including 8 to 30%, 8 to 25% and 8 to 20%. In one embodiment, the polyol, preferably glycerol, is present at 10 to 35%, including 10 to 30%, 10 to 25% and 10 to 20%. In one embodiment, the polyol, preferably glycerol, is present at 15 to 35%, including 15 to 30%, 15 to 25% and 15 to 20%.

In one embodiment, the lignin solution substantially comprises lignin, glycerol and a plasticiser as the only non-solvent components.

The plasticiser may be selected from the group consisting of a natural or synthetic latex, a polyether, a glycol, a dicarboxylic or tricarboxylic ester, a phthalate, an alkyl citrate and an acetylated monoglyceride.

The plasticiser may be a non-glycerol plasticiser,

The plasticiser may be present in a % by weight amount of the lignin solution of between 0.1 to 10%, including 01, to 8%, 0.1 to 7%, 0.1 to 6%, 01. to 5%, 0.1 to 4%, 0.1 to 3%, preferably 1.0 to 5%, more preferably 2 to 4% and even more preferably about 2.5, 3.0 and 3.5%. The plasticiser assists in improving the physical properties of the coating and is not essential to achieve a water resistant and/or strengthening coating and is not an active waterproofing or strengthening component itself.

In embodiments, the lignin solution, at the time of coating, has a viscosity of between 60 to 4500 mPa·s. Preferably, the viscosity of the lignin solution at coating is between about 100 to 4000 mPa·s, more preferably between about 200 to 3000 mPa·s, even more preferably between about 300 to 2000 mPa·s, still more preferably between about 350 to 1500 mPa·s and more preferably still between about 350 to about 1200 mPa·s.

The present inventors have found that the waterproofing and/or strengthening properties of the coating do not depend critically upon the viscosity of the solution and a wide range of viscosities can still result in an effective waterproof and/or strengthening coating. This is particularly so with the thermal annealing treatment as even very dilute, low viscosity solutions will lose water and pass through a more concentrated and supersaturated state. With the acid treatment it may be preferable that more concentrated solutions are employed. In practical terms, industry standards dictate that higher viscosity solutions are preferable as the current coating machines in wide use operate optimally with a solution having a viscosity in the 350 to 1200 mPa·s range. For this reason this is a preferred viscosity range purely because it provides advantages in operational adaptability.

Suitably, the pH of the lignin solution at coating is between about 5.0 to 12.0 or between about 6.5 to 11.0, preferably between about 7.0 to 9.5, more preferably between about 7.5 to 9.0 and even more preferably between about 8.0 to 8.9 including about 8.1, 8.2, 8.3, 8.4, 8.5, 8.6, 8.7 or 8.8. Lignin is soluble under alkaline conditions and so standard bases, such as ammonia, which operate in the general pH 8.0 to 12.0 range are ideal for solubilising the lignin and are preferred herein. However, partial solubility can be achieved with some lignin forms under mildly acidic or neutral conditions. Although all of the lignin may not dissolve which may result in some granulation in the final coating it will be appreciated that it may be useful in specific applications to create coatings of increased roughness for grip related advantages (such as compressive creep analysis for stacking boxes in chilled or humid conditions) using this lower pH range.

The coating step may be performed by drawdown coating, rod coating, spin coating, dip coating, Meyer rod coating, roller coating, spray coating, brush coating or air-knife coating. The spray and brush applications may be particularly suitable for wood and wood veneer coatings.

Preferably, the coating step is performed by rod coating as is commonly practised in the paper products manufacturing industry.

There are a wide range of coating methodologies and related technology which are well known in the art of coating with many commercial solutions available. It is an advantage of the present invention that the coating compositions are suitable for use with standard industry accepted coating technologies and so minimal or no modification to existing, hardware is required.

The weight of the coating is between about 1 to 35 GSM, 2 to 35 GSM or 5 to 35 GSM. Preferably, the weight of the coating is between about 5 to 30 GSM or 5 to 25 GSM. In, one embodiment, the coating weight is 6 to 35 GSM, 6 to 30 GSM, 6 to 25 GSM or 6 to 20 GSM. In a further embodiment, the coating weight is 8 to 35 GSM, 8 to 30 GSM, 8 to 25 GSM or 8 to 20 GSM.

It is a further advantage of the present invention, and a result of the manner in which the process works, being that the coating substantially remains on the external coated surface of the substrate and does not to any extent resulting in a functional change to the substrate impregnate the substrate material itself, that relatively low coating weights are sufficient to achieve commercially useful water resistant and/or strengthening properties. In the examples in WO 2000/28141 the coating weights increase from 38 GSM to 281 GSM, and in one case the weight of the treated paper is increased by 70%. This is as a result of the different mechanism of action whereby WO 2000/28141 relies on substantial impregnation of their composition into the paper article to achieve the desired improvement in strength. The present method employs a typical coating weight of less than 20 GSM and does not rely on, and in fact does not achieve, impregnation of the substrate to give the enhanced strength characteristics.

In one embodiment, the present method results in an increase in weight of the substrate of between 0.1 to 30%, 0.1 to 25%, 0.1 to 20%, 0.1 to 15% or 0.1 to 10%. Common weight increases observed in paper substrates using the present method are between 5% to 10%.

In one embodiment, the coating step is not performed under elevated pressures being those above atmospheric pressure. The coating step is preferably carried out at atmospheric pressure. It is still a further advantage of the present inventive method that high pressures do not need to be generated for a curing step. Many prior art processes employ such an energy intensive high pressure approach which requires additional infrastructure and so increases costs. The present method simply uses existing coating technology under standard conditions to apply a simple lignin solution to the substrate.

The heat treatment is a thermal annealing to allow the lignin to undergo the required physical transformation to provide the waterproof coating.

For most lignins, and in particular those discussed above as suitable lignin sources for use in the present process the heat treatment is exposure to temperatures selected from the group consisting of temperatures greater than 70° C., 80° C., 90° C., 100° C., 110° C., 120° C., 130° C., 140° C., 150° C., 160° C., 170° C., 180° C., 190° C., 200° C., 210° C. or 220° C. An upper temperature limit which may be combined with any one of these lower limits to form a suitable range would be the temperature at which the substrate becomes heat damaged or ignites. In one embodiment, this upper temperature limit may be either 230° C. or 240° C.

In one embodiment wherein, the lignin solution substantially comprises lignin as the only non-solvent component or comprises a sugar or sugar alcohol, such as glycerol, and/or a plasticiser in less than 10% by weight of the lignin solution, the heat treatment may be exposure to a heat source at a temperature between about 160° C. to about 230° C., preferably between about 170° C. to about 230° C., more preferably between about 180° C. to 225° C.

In one embodiment wherein the lignin solution comprises lignin and further comprises a sugar or sugar alcohol, such as glycerol, at greater than 10%, preferably greater than 15% by weight of the lignin solution, the heat treatment may be exposure to a temperature of between about 90° C. to about 230° C., preferably between about 100° C. to about 230° C., more preferably between about 110° C. to 225° C.

The heat treatment, or thermal annealing, step is one potential route to a waterproof and/or strengthening coating using the present method, the other being the acid treatment step. Without wishing to be bound by any particular theory, the inventors postulate that the thermal annealing and acid treatment steps represent a transition in the form of the lignin from a supersaturated state (glass state) in the lignin solution to a crystalline state (presenting a shiny finish on the substrate) and this can be achieved by either heating to suitable temperatures or by rapidly lowering the pH. Thus, the two differing approaches of high temperature or acid treatment effectively achieve the same outcome in terms of the critical transition of the lignin. If this transition is not achieved then the coating will not be an effective waterproof barrier and/or will not provide the desired improved strength. For example, in testing when the thermal annealing was carried out at lower temperatures, without the addition of significant quantities of glycerol, then a coated paper with a powdery finish, which could be largely removed by gentle rubbing, was formed. This was not an effective waterproof coating and demonstrates that if the critical transition temperature (for the thermal annealing approach) is not reached then the lignin present on the substrate cannot transform to become an effective barrier to water.

For prior art references which employ lignin as a component in a waterproof coating the lignin cannot be contributing to the waterproofing properties to any significant extent unless a minimum temperature of 130° C., and preferably at least 160° C. (for coatings comprising lignin with little or no glycerol) or of 80° C., preferably 90° C. (for coatings comprising lignin and significant amounts of glycerol as defined above), is employed or a suitable acid treatment step is performed. The upper temperature limit is defined by the temperature which the substrate can withstand before becoming damaged.

It is an advantage of the present invention that the heat treatment step can be completed in a matter of seconds when carried out in industrial heating equipment such as is commonly employed in paper making. In one embodiment, the heat treatment step is complete in less than 10 min, 6 min, 5 min, 4 min, 3 min, 2 min, 1 min or 30 seconds.

The acid treatment may comprise contacting the lignin coating with an acid having a pH below 4.0 or below 3.5. Preferably, the pH is about 3.5 or below with a lower limit being 0 or 1.

The acid may be an inorganic (mineral) acid or an organic acid. It is preferred that the acid is a volatile acid. This allows for the easy removal of the acid without leaving residues on the substrate or within the coating. Weak acids are preferred. It is highly preferred that the acid is a volatile weak acid, such as acetic acid. In one embodiment, the acid may be selected from the group consisting of acetic acid, formic acid, phosphoric acid and citric acid. The acid may be diluted or used neat. If diluted then a miscible solvent such as ethanol, ethyl acetate, glycerol or water may be used. The choice of solvent will depend on the subsequent exposure of the coating to any naked flames during drying and the ensuing safety issues raised. In this regard, glycerol may have an advantage in reducing potential flammability.

When the lignin solution for the coating is a mildly acidic solution then it may be preferred that the treatment step is a heat treatment (thermal annealing) step, as previously described, rather than an acidic treatment.

The acid may be sprayed onto the coating, or otherwise applied, to effect the transition in the lignin to form an effective waterproof barrier and/or providing enhanced strength characteristics. Particularly, the acid may be applied in an atomized spray which produces an even contact across the coated substrate surface such that no pooling or run off of acid is observed.

When the treatment is an acid treatment then the method may further include the step of drying the lignin coating. The drying may be under ambient conditions or may involve heating or reduced pressure. This drying step is simply to remove excess moisture and temperatures which would induce thermal annealing are not necessary for drying.

In embodiments, after the coating has dried the waterproof and/or strengthening coating comprises lignin as the major active waterproofing and/or strength enhancing constituent.

The dried coating may comprise greater than 60%, 70%, 80%, 90%, 95%, 96%, 97%, 98% or 99% by weight lignin.

In a preferred embodiment, after the coating has dried the waterproof and/or strengthening coating consists essentially of lignin as the active waterproofing constituent.

In one embodiment, after the lignin coating has dried the waterproof and/or strengthening coating consists of lignin as the active waterproofing constituent.

As was described earlier, it is a unique advantage of the present invention that an effective waterproof and/or strengthening coating can be formed on a substrate purely by the use of lignin as the active waterproofing and/or strengthening component in the coating and, specifically, by the transformation of the lignin to form a waterproof and/or strengthening coating by thermal annealing or acid treatment.

In certain embodiments, the lignin solution may be treated with a deodorising agent. The deodorising agent may be an oxidising agent or a suitable absorbent. In one embodiment, the deodorising agent is selected from the group consisting of activated carbon, ozone, hydrogen peroxide, diatomaceous earth, activated clays, ion-exchange resins or silica gel. It may be desirable to have a deodorising agent, such as activated carbon, when the paper product being coated is used for food applications. Lignin has an associated odour when applied in a coating such as those described presently. In many applications this would not present any problems but if the paper product is in intimate contact with the food then it is possible the odour may be imparted, to some extent, to the food. In such instances it is a simple matter of using a known deodorising agent to contact or pre-treat the lignin composition. The use of activated carbon in this manner is described in the experimental section.

In embodiments where the lignin solution comprises a deodorising agent then it may be particularly desirable to add a plasticiser to the solution prior to coating. A plasticiser is also useful, as described earlier, in the embodiment wherein higher glycerol levels are incorporated into the lignin solution (10% and above). By way of non-limiting example, the plasticiser may be selected from the group consisting of a natural or synthetic latex, a polyether, a glycol, a dicarboxylic or tricarboxylic ester, a phthalate, an alkyl citrate and an acetylated monoglyceride. Other commercially available plasticisers are well known in the art. It has been found that the use of deodorising agents, such as activated carbon, can reduce the natural plasticity of the lignin coating. To recover this loss in plasticity all that is required is the addition into the alkaline lignin solution of a small quantity of a plasticiser such as a latex. A representative amount for the plasticiser would be between 0.1 to 10%, including 01. to 8%, 0.1 to 7%, 0.1 to 6%, 01. to 5%, 0.1 to 4%, 0.1 to 3%, preferably 1.0 to 5%, more preferably 2 to 4% and even more preferably about 2.5, 3.0 and 3.5%. of the coating composition. For most plasticisers, such as latex, a range of 1 to 6%, preferably 1.5 to 5%, more preferably 2 to 4% and even more preferably about 2.5, 3.0 and 3.5% is appropriate. The amount required will depend upon the plasticising properties of the plasticiser used and can be determined by straightforward trials. It is important to understand that this relatively small amount of plasticiser does not substantially contribute to the waterproofing and/or strengthening properties of the coating to any significant extent. That is, the plasticiser is not considered an active waterproofing and/or strengthening component of the present compositions or method.

A second aspect of the invention resides in a composition which comprises lignin, as the major active component, at least partially dissolved in a solvent.

The composition may be as described for the first aspect. Preferably, the solvent is an alkaline solution.

The alkaline solution, pH, lignin type and source and other aspects of the composition may be as described for the first aspect.

The composition consists essentially of lignin, as the active waterproofing and/or strengthening component. This means that it is the lignin which is substantially responsible for the waterproof and/or strengthening activity imparted by the composition.

In a further embodiment, the waterproofing and/or strengthening composition consists of lignin, as the active waterproofing and/or strengthening component.

The composition may further comprise or be contacted with a deodorising agent and/or a plasticiser, as described for the first aspect.

In one embodiment, the solvent is an aqueous ammonia solution.

In one embodiment, the composition comprises between about 15% to about 40% by weight lignin and about 60% to about 85% by weight ammonia solution.

In this embodiment, the composition preferably comprises between about 25% to about 35% by weight lignin and about 65% to about 75% by weight ammonia solution.

In one embodiment, the composition further comprises and agent selected from a sugar and a sugar alcohol. Apecific examples may be as recited for the first aspect.

The sugar alcohol may be a polyol, preferably glycerol, and may be present in a % by weight amount of the composition of between 0.1 to 35%, including 0.1 to 30%, 0.1 to 25% and 0.1 to 20%. In one embodiment, the polyol, preferably glycerol, is present at 1 to 35%, including 1 to 30%, 1 to 25% and 1 to 20% or 5 to 35%, including 5 to 30%, 5 to 25% and 8 to 20% or 8 to 35%, including 8 to 30%, 8 to 25% and 8 to 20%. In one embodiment, the polyol, preferably glycerol, is present at 10 to 35%, including 10 to 30%, 10 to 25% and 10 to 20%. In one embodiment, the polyol, preferably glycerol, is present at 15 to 35%, including 15 to 30%, 15 to 25% and 15 to 20%.

In one embodiment, the composition comprises the following in % by weight amounts of the total composition:
  (a) between about 10% to about 40% lignin;
  (b) between about 35% to about 80% ammonia solution; and
  (c) between about 5% to about 30% of a sugar or sugar alcohol.

Preferably, in combination with any recited value of (b) or (c), the lignin is present in between about 15% to about 35%, more preferably between about 18% to about 30%, even more preferably between about 20% to about 27%.

Suitably, in combination with any recited value of (a) or (c), the ammonia solution is between about 40% to about 70%, preferably between about 45% to about 65%, more preferably about 50% to about 60%.

Preferably, in combination with any recited value of (a) or (b), the sugar or sugar alcohol is between about 10% to about 25%, more preferably between about 15% to about 25%.

Preferably, the sugar or sugar alcohol is as described for the first aspect. Most preferably it is glycerol.

In one embodiment, the composition further comprises a plasticiser as described for the first aspect. Preferably, the platsiciser is a latex.

In one embodiment, the composition comprises the plasticiser in a % by weight amount of between about 0.1% to 5%, preferably 1.0% to about 4.0% each of which ranges may be combined with any of those ranges cited above for (a),(b) and (c).

In one embodiment, the composition comprises the following in % by weight amounts of the total composition:
  (a) between about 18% to about 27% lignin;
  (b) between about 50% to about 67% ammonia solution;
  (c) between about 10% to about 25% glycerol; and
  (d) between about 0.1% to about 4% latex.

In one embodiment, the pH of the composition is between about 7.5 to 9.5, preferably between about 8.0 to about 9.0.

In one embodiment, the composition will have an oven dried solids content of between about 25 to 45%DS, preferably between about 27 to 40%DS.

In one embodiment, the Brookfield's Viscosity of the composition is between about 100 to 500, preferably between about 150 to about 400.

According to a third aspect of the invention there is provided a use of the composition of the second aspect to form a coating on a substrate.

The substrate may be as described for the first aspect.

Such a coating is surprisingly water resistant and/or will provide improved strength characteristics to the substrate, as will be seen in the examples, given the fact that it is only lignin which is contributing to any significant extent to the water resistance and/or strengthening properties.

The use will be as described in each statement made in relation to the first aspect as if each of those statements was recited explicitly for the third aspect.

A fourth aspect of the invention resides in a substrate comprising a coating formed by the method of the first aspect.

The waterproof and/or strengthening coating may employ the composition of the second aspect.

The substrate may be as described for the first aspect.

EXPERIMENTAL

General

Two different lignin-based formulations were generated for use in the following experiments. The first was a simple ammoniacal lignin solution (LBCv1.0) and the second was a similar ammoniacal lignin solution but which had been treated with activated carbon as a deodorising agent (LBCv1.1+AC).

The following protocols describe methodology to create formulations of a specific target viscosity (ca. 1000-1200 mPa·s) within the laboratory by batch in open vessels. This was achieved by first evaporating in an open beaker to a concentrated state (Viscosity greater than 2000 mPa·s—overshooting the end point—higher viscosity and lower pH) and then adding ammonia to adjust 'up' to a target pH (8.4-5). By making the formulation in this manner it is possible to consistently achieve the target viscosity.

While this approach is suitable for the laboratory it may be preferable at scale to employ the use of large stirred and heated reactors and partial vacuum (12-16 mm Hg) to rationalise the formulation creation process—i.e. evaporate under partial vacuum (and lower temperature) in a closed reactor system to an end point. Through this work it has been determined that a wide range of viscosities (as low as 80 mPa·s and as high as 4000 mPa·s) of alkaline lignin solution will still act to form an effective barrier film if appropriately annealed/acid treated.

Preparation of LBCv1.0

Weigh raw lignin (290g) and add ammonia solution (1 L 0.5 M $NH_3$) into a vessel at least twice the final expected volume (to allow space for initial foaming), creating a ca. 300 g lignin/kg 0.5 M $NH_3$ solution. Mix by overhead stirring using blade attachment at high speed (ca. 600 rpm) until formulation is homogenous. Reduce stirring speed (ca. 200-300 rpm) and blend (either by magnetic or overhead stirring) within the vessel exposed to ambient conditions and heated at 80° C. (by heating plate) for ca. 24 hrs. Post 24 hrs measure the pH of the formulation. If pH is greater than 7.2 continue stirring and recheck every 1-2 hours. Once pH approaches neutral (ca. 7.2), formulation will begin to thicken and appear 'toffee like', This change may be rapid.

The Brookfields Viscosity (BrViS) of a subsample should then be measured to confirm if it is greater than 2000 mPa·s. If BrVis is too low continue stirring and subsample every hour until BrVis within range (>2000 mPa·s). Once formulation is within range adjust the pH to ca. 8.4-5 with neat NH3 (28-30%). Check the BrVis which should be in the range of 1000-1200 mPa·s at this pH (60 rpm, spindle 3). This is the final formulation (LBCv1.0) which may be sealed and preferably refrigerated until usage. Prior to usage ensure pH is within preferred range (pH 8.4-5) and adjust if required (28% NH3). Check final BrVis is within range (1000-1200 mPa·s).

Note that foaming may be managed with the addition of aerosolised ethanol or defoamer as required. Optionally, and as discussed above, the reaction may take place in a sealed vessel capable of drawing a partial vacuum (approx 12-16 mm Hg) to remove volatile gases produced during stirring. In addition the required stirring time at 80° C. can be significantly shortened using a partial vacuum to under 2 hours. Experiments have shown a greater range of pH's (i.e. less than 8.4-8.5) and lower viscosities (i.e. lower than 1000-1200 cps) also form an effective film and provide good water barriers so long as they are appropriately annealed.

Preparation of LBCv1.1+AC

Weigh a volume of Activated Carbon (AC) approximately to 1/3 (or as low as 1/12) of the expected total final formulation volume and record weight (i.e. if creating 1 kg of formulation place 333mL of AC into a percolation column and record dry weight (ca. 165 g)). Wash AC with boiling milliQ $H_2O$ (0.45 µm filtered) and decant fines. Repeat until runoff from AC is clear. Drain as much milliQ $H_2O$ as possible and transfer into a pre-weighed percolation column or like vessel. Calculate wet AC weight and determine amount of trapped and bound $H_2O$ (e.g. if final wet AC weight is 403 g then trapped/bound AC $H_2O$ is ca. 238 g). Create ammonia solution (0.5M NH3) taking into consideration the trapped/bound AC $H_2O$ (e.g. if 403 g) and reduce volume accordingly (e.g. 33.8 mL (28% NH3) in 597 mL milliQ $H_2O$, total volume including trapped/bound $H_2O$ is 1000mL for target molarity of 0.5M NH3).

Weigh lignin (290 g) and add ammonia solution (597 mL of 0.5 M $NH_3$ as described above) into a formulation vessel at least twice the final expected volume (to allow for initial foaming). Mix by overhead stirring using blade attachment at high speed (ca. 500 rpm) until formulation is homogenous. Reduce stirring speed (ca. 100-200 rpm). Circulate lignin ammonia solution through the AC percolation column and return outflow to formulation vessel. Continue circulation and overhead stirring using paddle attachment with the vessel exposed to atmospheric pressure and heated at 80° C. (by heating plate) for ca. 3 hrs. The AC may be added into the alkaline ammonia solution itself but it is preferred that the column approach described be employed.

Remove subsample and allow to cool to ambient temperature. Spot check for odour removal by nose and comparison to typical formulation. If not deemed satisfactory continue AC column treatment and repeat spot check in 30 min intervals. Once satisfactory, remove from heat and stop treatment.

Blend formulation (either by magnetic or overhead stirring) within a vessel exposed to ambient conditions and heated at 80° C. (by heating plate) for 20 hrs. Post 24 hrs measure the pH of the formulation. If pH is greater than T2 continue stirring and recheck every 1-2 hours. Once pH approaches neutral (ca. 7.2), formulation will begin to thicken and appear 'toffee like'. This may be quite rapid.

Measure the Brookfields Viscosity (BrViS) of a subsample and confirm greater than 2000 mPa·s. If BrVis is too low continue stirring and subsample every hour until BrVis within range (>2000 mPa·s). Once formulation is within range cool to ambient, adjust the pH to ca. 8.4-5 with neat NH3 (28%). Check the BrVis which should be in the range of 1000-1200 mPa·s (60 rpm, spindle 3). This is the final formulation (LBCv1.1+AC) which should be sealed and preferably refrigerated until usage. Prior to usage ensure pH is within range (pH 8.4-5) and adjust if required (28% NH3). Finally, check final BrVis is within range (1000-1200 mPa·s).

As discussed for the LBCv1.0 formulation, foaming may be managed with addition of aerosolised ethanol or defoamer and the reaction may optionally take place in a sealed vessel capable of drawing a partial vacuum (ca. 12-16 mm Hg) to remove volatile gases produced during stirring. Once formulation is blended vacuum is switched off and formulation passed through a GAC column for ca. 2-6 bed volumes with GAC treated formulation subsampled and tested by noise until odour is suitably reduced. Vacuum is then resumed until formulation is ready. Once again, experiments have shown a greater range of pH's (i.e. less than 8.4-8.5) and lower viscosities (i.e. lower than 1000-1200 cps) also form an effective coating which provides good water barriers if appropriately annealed.

Thermal Annealing Experiments

A temperature annealing series using the above standard (LBCv1.0) and deodorised (LBCv1.1+AC) formulations (both pH 8.4-5 BrVis 1000-1200—Brookfield viscometer 1000 to 1200 cp) coated onto Kraft 205 paper on the shiny side by drawdown coater was performed.

For the LBCv1.0 the coating application was Rod 0+Rod 9 on a drawdown coater for annealing temperatures 39° C. (preconditioning oven and max thermal treatment for room temp samples) and then 100° C. to 220° C. (in 10° C. intervals). All paper used in the experiments was preconditioned by heating at 39° C. prior to coating. The duration of the coated samples within the oven was 90 s after the rod 0 application and 5 min after the second coating application (Rod 9). Therefore, the total annealing duration was 6 min 30 s.

For LBCv1.1+AC the coating application was Rod 0+Rod 9 and Rod 0+Rod 6 for annealing temperatures 160° C. to 220° C. (in 10° C. intervals). As above, the duration within oven was 90 s for Rod 0, 5 min for second application (Rod 9 and Rod 6). Total annealing duration 6 min 30 s.

Figure 1:
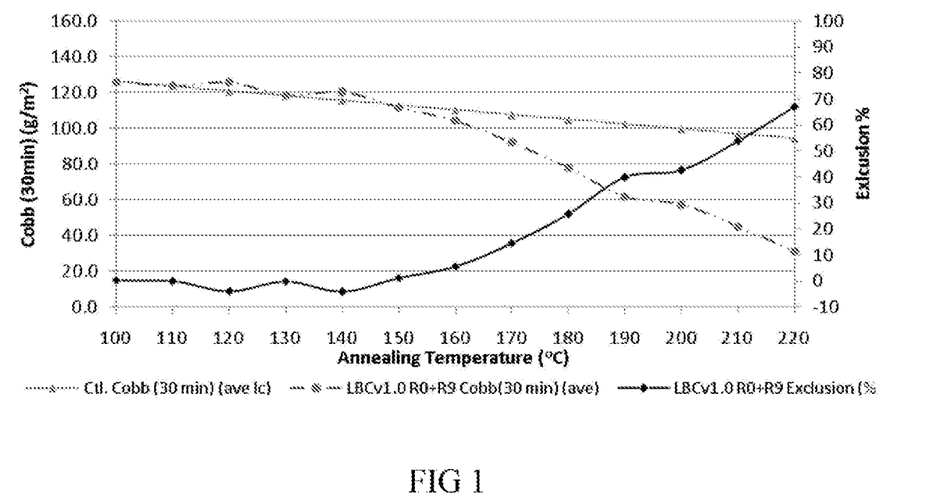
FIG. 1 is a graphical representation of the effect of annealing temperature on the waterproof coating for a lignin composition of the invention.
Figure 2:
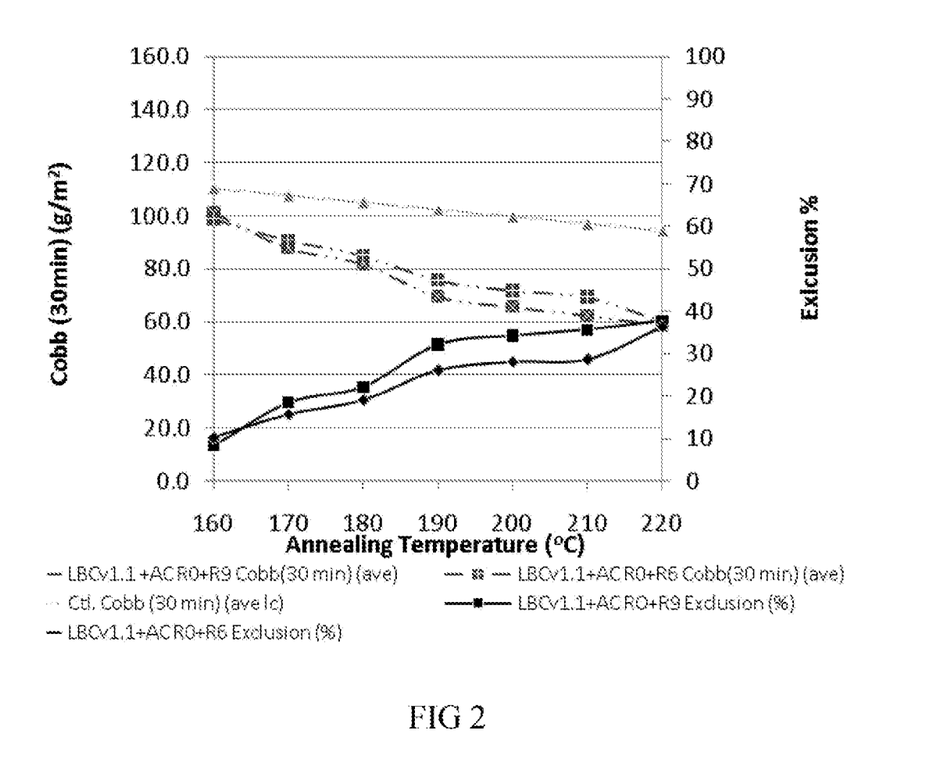
FIG. 2 is a graphical representation of the effect of annealing temperature on the waterproof coating for a deodorised lignin composition of the invention.

The results of these experiments are presented in table 1, below, and are shown graphically in FIGS. 1 (LBCv1.0) and 2 (LBCv1.1+AC). Control measurements in the results are from paper that has been through the heat treatment without being coated with any formulation.

TABLE 1

Comparison of Cobb (30 min) for typical (LBCv1.0) and deodorised (LBCv1.1 + AC) formulations at a range of annealing temperatures.

| | | Cobb (30 min) g/m2 | | | Exclusion (%) rel. Ctl. | | |
| --- | --- | --- | --- | --- | --- | --- | --- |
| | | | | | | | LBCv1.1 + AC |
| | | | | | | | Rod |
| Temp (° C.) | Ctl.* | LBCv1.0 Rod 0 + Rod 9 | LBCv1.1 + AC Rod 0 + Rod 9 | Rod 0 + Rod 6 | LBCv1.0 Rod 0 + Rod 9 | Rod 0 + Rod 9 | 0 + Rod 6 |
| 39 | 142.6 | 136.8 | n.d. | n.d. | 4.0 | n.d. | n.d. |
| 100 | 126.4 | 125.9 | n.d. | n.d. | 0.4 | n.d. | n.d. |
| 110 | 123.7 | 123.7 | n.d. | n.d. | 0.0 | n.d. | n.d. |
| 120 | 121.0 | 125.8 | n.d. | n.d. | −3.9 | n.d. | n.d. |
| 130 | 118.4 | 118.6 | n.d. | n.d. | −0.1 | n.d. | n.d. |
| 140 | 115.7 | 120.4 | n.d. | n.d. | −4.0 | n.d. | n.d. |
| 150 | 113.1 | 111.8 | n.d. | n.d. | 1.2 | n.d. | n.d. |
| 160 | 110.4 | 104.3 | 101.2 | 99.0 | 5.6 | 8.3 | 10.3 |
| 170 | 107.8 | 92.1 | 87.8 | 90.8 | 14.5 | 18.5 | 15.7 |
| 180 | 105.1 | 78.0 | 81.8 | 85.0 | 25.8 | 22.2 | 19.1 |
| 190 | 102.4 | 61.6 | 69.6 | 75.7 | 39.9 | 32.1 | 26.1 |
| 200 | 99.8 | 57.3 | 65.7 | 71.8 | 42.6 | 34.2 | 28.0 |
| 210 | 97.1 | 44.8 | 62.5 | 69.3 | 53.9 | 35.6 | 28.6 |
| 220 | 94.5 | 31.2 | 58.9 | 60.2 | 67.0 | 37.7 | 36.3 |

*Based on average control with linear correction.

Coating Weight Experiments

A complete coating weight series was performed using the standard formulation (LBCv1.0, pH8.4-5, BrVis1000-1200) applied onto K205 shiny side by a drawdown coater. Application was Rod 0 which was flashed for 90 s at 220° C. followed by Rod 0 to Rod 9 thermally annealed for 5 min at 220° C. The total annealing duration was therefore 6 min 30 s. A rod 0 coating was also made by itself (i.e. no subsequent coating) and annealed for 5 min at 220° C.

Figure 3:
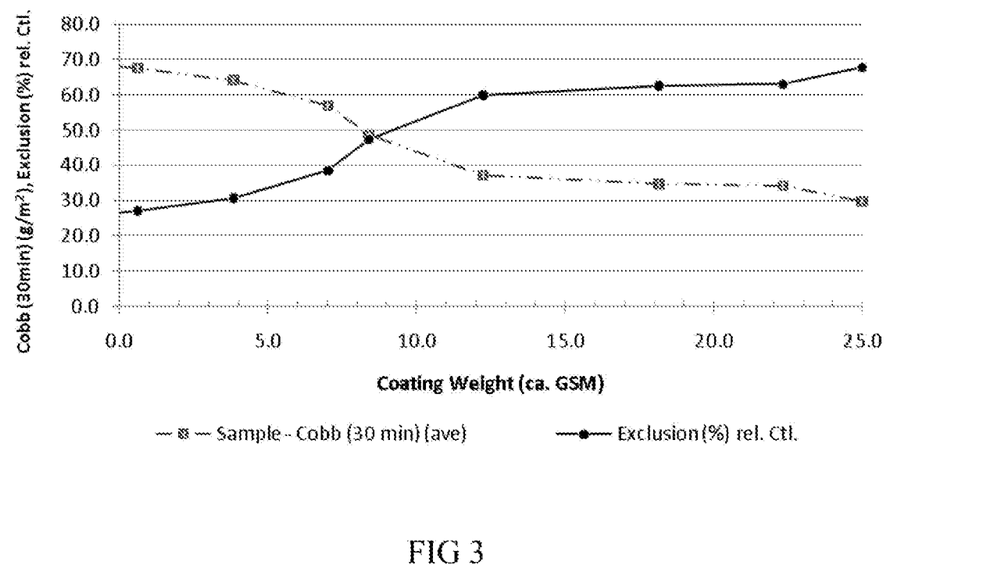
FIG. 3 is a graphical representation of the effect of coating weight on the waterproof coating for a lignin composition of the invention.

The results of these experiments are presented in table 2, below, and are shown graphically in FIG. 3.

TABLE 2

Standard formulation (LBCv1.0, pH 8.4-5, BrVis 1000-1200) on K205 shiny side applied at different coating weights (Rod 0, Rod 0 + (Rod 0-9)).

| Coating Method | Coating (ca. GSM) | Cobb (30 min) g/m2 Sample (ave) | Exclusion (%) rel. Ctl. |
| --- | --- | --- | --- |
| R0 (5 min) | 0.0 | 76.0 | 21.3 |
| R0 + R0 | −5.3 | 68.7 | 25.8 |
| R0 + R1 | −4.2 | 71.6 | 22.6 |
| R0 + R2 | 0.6 | 67.6 | 27.0 |
| R0 + R3 | 3.8 | 64.2 | 30.6 |
| R0 + R4 | 7.0 | 56.9 | 38.5 |
| R0 + R5 | 8.4 | 48.7 | 47.4 |
| R0 + R6 | 12.2 | 37.1 | 59.9 |
| R0 + R7 | 18.2 | 34.7 | 62.6 |
| R0 + R8 | 22.3 | 34.2 | 63.1 |
| R0 + R9 | 25.0 | 29.8 | 67.8 |
| Ctl(5 min) | −7.8 | 96.6 | N/A |
| Ctl(6.5 min) | −9.2 | 92.6 | N/A |

Experiments with Activated Carbon and Plasticiser

The lignin plus activated carbon composition was used to assess the effects of plasticisers on coating. The plasticiser used was natural latex (LaN) added by % weight (0.5, 1.0 and 2% (w/w)). The compositions were coated in duplicate by drawdown coating onto K205 shiny side through application of Rod 6 (5 min) followed by Rod c (90 s) and annealed at 220° C. A summary of selected results is included in table 3.

TABLE 3

Lignin + GAC in Plasticizer Investigation with Natural Latex (LaN) addition.

| Sample | Cobb (30 min) (g/m2) | pH (Amb) | BrVis (mPa·s) Min | BrVis (mPa·s) Max | Dry Solid (% DS) | Odor Ranking |
| --- | --- | --- | --- | --- | --- | --- |
| Lignin + GAC | 18.95 | 8.3 | 280 | 310 | 24.7 | Min |
| Natural Latex (LaN) | n.d | 10.5 | 660 | 770 | 60.0 | n.d |
| Lignin + 0.5% LaN | 23 | 8.4 | 430 | 460 | 25.8 | Min |
| Lignin + GAC + 1% LaN | 19.45 | 8.5 | 500 | 520 | 25.8 | Min |
| Lignin + GAC + 2% LaN | 12.8 | 8.5 | 480 | 560 | 26.5 | V.min |

Acid Treatment Experiments

An acid treatment using a deodorised (LBCv1.1+AC) formulation with 2% natural latex (w/w), coated onto Kraft 205 paper on the shiny side with a single Rod 6 application by drawdown coater was performed.

Glacial acetic add was applied evenly to the lignin coated substrates using an atomized spray to obtain even contact across the surface with no pooling or run off. It has been found that acetic acid which is diluted in a variety of miscible volatile solvents such as ethanol or ethyl acetate may also be successfully used. Water and glycerol is also suitable.

Post acid application the treated substrate was oven dried at 110° C. for five minutes to speed up residual moisture removal. It has been observed that leaving treated samples in a well vented area such as a fume hood has a comparable effect but takes longer.

A comparison between coated substrates with surfaces treated with acid (5 min, 100° C.), without acid and coating dried (5 min, 100° C.), and without acid and coating annealed (5 min, 220° C.) are presented in Table 4, below. Control measurements in the results are from paper that has not been through any heat or acid treatment and without being coated with any formulation.

TABLE 4

Lignin in Acid Treatment Investigation

| Sample | Cobb (30 min) (g/m²) | Odor Ranking | Transfer Ranking |
| --- | --- | --- | --- |
| Lignin + Acid (100% GAA) | 86.0 | None | None |
| Lignin + Drying (110° C. 5 min) | 116.7 | None | Major |
| Lignin + Anneal (220° C. 5 min) | 41.1 | Min/Mod | None |
| Uncoated Control | 126.0 | None | None |

Samples treated by acid produced a surface that did not easily transfer post prolonged water contact (30 min) and a Cobb value comparable to industry standards such as SuperVisy, whose performance is ca 87 g/m2 by Cobb (30 min) analysis. It is believed that further optimisation of this acid treatment process can produce further improved Cobb values.

Annealing Using Lignin Formulation with Activated Carbon (AC) and Latex

Using a deodorised formulation of lignin with granular activated carbon (GAC) treated with a natural latex plasticizer (+2% LaN) at appropriate viscosity (BrVis 620-820 (mPa·s)) a full annealing duration investigation was conducted.

Samples were coated by drawdown coating onto K205 Shiny liner board by application of Rod 6 for 5, 4 and 2 min followed by Rod c for 90 s at 220, 200 and 180° C. thermal annealing conditions (for a total of 6.5, 5.5 and 3.5 minutes treatment respectively). A single Rod 6+Rod C (5 min, 90 s-160 deg) and Rod 1+Rod 1 (2 min, 90 s-160 deg) were created as examples of 'worst case' temperature profiles. A summary of the results is included in table 5 and represented graphically by the surface plot in FIG. 4.

TABLE 5

Lignin + GAC + LaN (2%) in Annealing Investigation - Cobb (30 min) data summary.

| Cobb (30 min) (g/m2) | | Annealing Temperature (deg) | | | |
| --- | --- | --- | --- | --- | --- |
| | | 220 | 200 | 180 | 160 |
| Duration (min) | 6.5 | 51 | 59 | 75 | 91 |
| | 5.5 | 55 | 64 | 81 | n.d |
| | 3.5 | 48 | 64 | 82 | 106 |

A good outcome from such a trial is a surface that achieves a barrier coating of less than or equivalent to industry representatives, such as SuperVisy, whose performance is ca. 87 g/m2 by Cobb (30 min) analysis. It can be seen that the present coatings perform better than comparative standards and values within the green range of FIG. 4 (Cobb (30 min) of 40-65 (g/m2)) are obtained which is considered representative of an excellent waterproof coating. It is only when annealing temperatures drop below 160°

Figure 4:
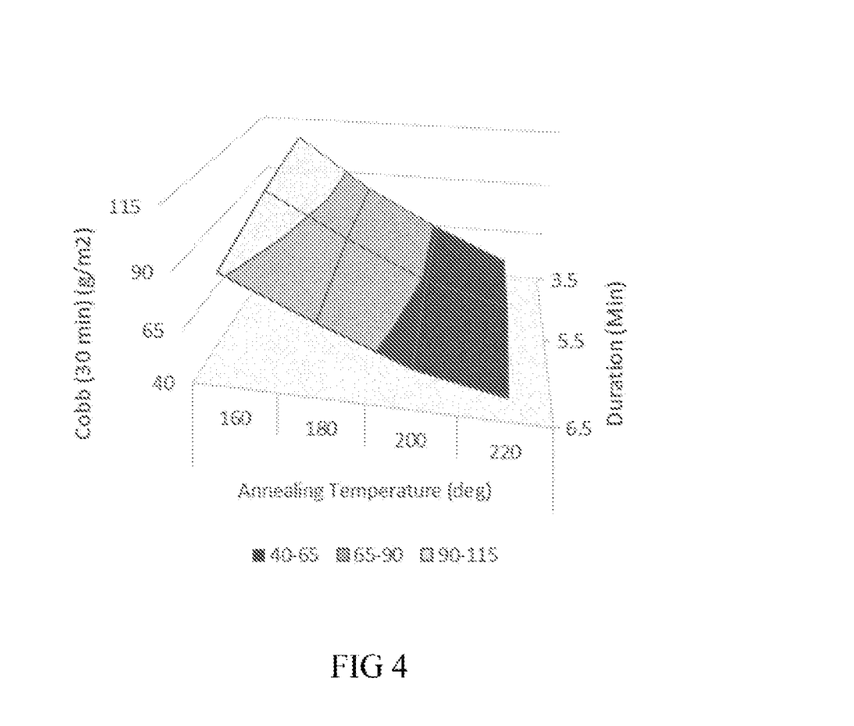
FIG. 4 is a graphical representation of the effect of both annealing temperature and duration on coating quality.

C. that values reach what is shown in FIG. 4 to be the red zone representing a coating which would not be commercially desirable.

Experiments with Lignin Solution at Non-alkaline pH

Mix 10.00 g of $NH_3$ (30%) with 413 g DI $H_2O$ creating a 0.4 M $NH_3$ solution into an ambient reactor. Blend with 135.1 g lignin for total formulation of 558.9 g and a final target dry solids of (%DS) of 22.66. The target dry solids (%DS) quoted compensates for the moisture content of the starting lignin. In this case the lignin moisture content used was 6.3%.

The sample displayed a pH of 7.1 and had a viscosity of BrVis 80-100 mPa·s. The sample was stored for 2 days and it was found that the pH had dropped further to 6.9 (ambient) and small lignin aggregates had formed. It was obvious that some lignin had dropped out of solution, likely due o the now mildly acidic pH, and was in a suspension state.

In terms of performance the pH 6.9 formulation was coated onto Kraft linerboard (K205) along with two similar formulation samples but where the pH had been adjusted back 'up' to 7.7 and 8.8. AU samples were annealed at 220° C. after coating. The results are shown in table 6.

All coatings created a substrate that looked good, but had a higher friction surface instead of a standard smooth gloss. This would likely be due to the use of a formulation in which the lignin was only partially solubilised. Cobb values improved as the pH increased, and useful water barrier properties were achieved. This indicates that although an alkaline lignin solution is preferably employed as the coating composition, a useful waterproof coating can be obtained even when a mildly acidic lignin solution is the starting point so long as the subsequent treatment, in this case a heat treatment, achieves the required transition of the physical form of the lignin.

TABLE 6

Cobb values for coatings formed using lignin coating composition of varying pH values.

| Sample | pH (Ambient) | Cobb (30 min) (g/m2) | Dry Solids % DS | BrVis (mPa · s) Min | BrVis (mPa · s) Max |
|---|---|---|---|---|---|
| LBCv1.0 (pH 6.9) | 6.9 | 46.3 | 24.1 | 80 | 100 |
| LBCv1.0 (pH 7.7) | 7.7 | 41.6 | n.d | 90 | 110 |
| LBCv1.0 (pH 8.8) | 8.8 | 40.4 | n.d | 50 | 70 |

Preparation of Deodorised formulation at Scale

Activated carbon column is firstly prepared as follows:
1. Fill with 375 kg of granular activated carbon and seal flange lid.
2. Charge with hot water (water & steam) with top vent open, until full.
3. Close top vent and purge with hot water until no more air bubbles are in the discharge.
4. Remove flange lid, drain to surface of carbon (ensuring carbon is covered with water at all times), and leave overnight. Column will have to be pre-heated prior to use.

The alkaline lignin coating solution is then prepared as follows:
1. Add 2.5 tonnes of water (deionized (DI) or reverse osmosis (RO) treated if possible—should be ca. pH 5.5) to the reactor at ambient temperature.
2. Add 100 kg of aqueous ammonia (if it is 30% ammonia) while stirring at ambient temperature. The vacuum will be on and the condenser recirculating (reflux) into the reactor.
3. Begin heating reactor and blending 1 tonne of lignin. Approximately 10 L of ethanol may be required to reduce foaming.
4. Close reactor and heat to 85-95° C. until lignin is dissolved (continue reflux conditions).
5. Circulate lignin solution through activated carbon column. Column can be topped up with formulation with top valve open to fill headspace with minimal disturbance of carbon bed. Then close top valve and begin flow through operation while taking initial water discharge (the column void) to waste. As the lignin formulation breaks through (not initial color change, but when output from column is comparable in viscosity to inlet—this can be tested by touching formulation with gloves and comparing resistance to pulling thumb and forefinger apart—we can assist with this stage) divert the discharge from waste to the reactor. Re-circulate 4 to 5 reaction volumes (12000 L to 15000 L) of formulation through the column. Then open top valve and drain remaining liquid in the column into reactor.
6. Reduce the formulation volume under partial vacuum until it reaches a desired room temperature viscosity.

The above experimental approach will provide deodorised formulations without plasticiser which are appropriate as inputs to the next stage of coating followed by heat treatment or acid treatment to obtain a waterproof coating. Alternatively a plasticiser may be added after step 6 upon transferring the composition into an appropriate storage container. This methodology will be a practical approach for producing formulation at the scale required for industrial application.

Reduced Temperature and Coating Weight with High Glycerol Inclusion

Figure 5:
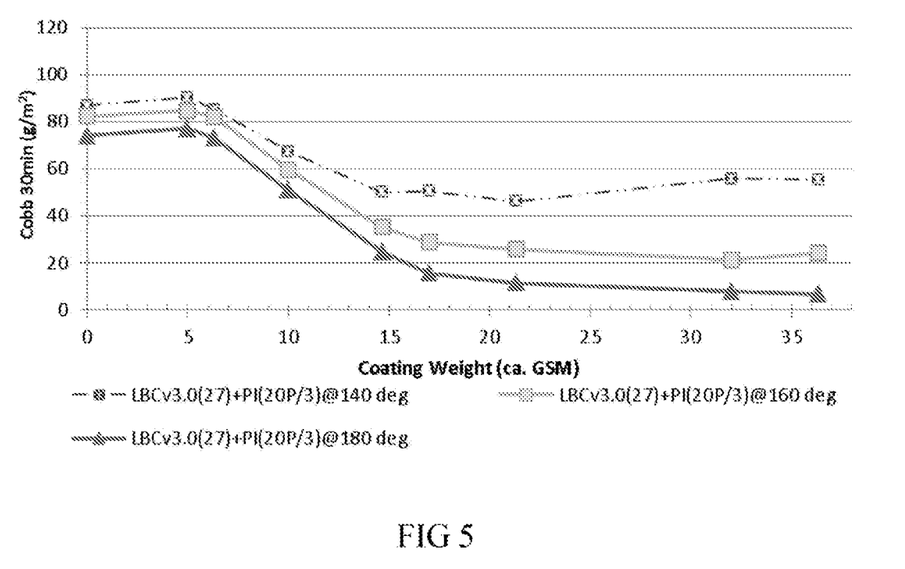
FIG. 5 is a graphical representation of the obtained Cobb values of a lignin and 20% glycerol containing formulation coated onto linerboard at different coating application weights (Rod 1-Rod 8) and annealing conditions (140, 160 and 180° C.)

A 'low thermal optimised formulation' (LBCv3.0 (27)+ PI(20P/3)) (531% $H_2O$, 2.5% Ammonia (25%), 3% Latex (61%DS), 20% Glycerol, 21.4% Lignin all w/w) of Brookfield's Viscosity 180-320 (mPa·s), pH 8.3-5, and oven dried solids of 32-34%DS was coated onto Kraft liner board (ca. 185 GSM) shiny side by drawdown coater. Application was in a single coat, Rod 1 to Rod 8, duration within annealing oven was 5 min, for temperatures 140, 160 and 180° C. Cobb values of the resulting substrates are shown below in table 7 and are represented graphically in FIG. 5.

TABLE 7

Comparison of Cobb (30 min) for low thermal optimised (LBCv3.0 (27)

| LBCv3.0(27) + PI(20P/3) | | Cobb 30 min (g/m2) | | |
|---|---|---|---|---|
| Application Method | Ca. Coating Weight (GSM) | Annealing Conditions (° C.) | | |
| | | 140 | 160 | 180 |
| Control (Kraft 185) | | 86.7 | 82.4 | 74.0 |
| R1 | 4-7 | 90.1 | 84.7 | 77.0 |
| R2 | 5-8 | 85.0 | 82.0 | 72.9 |
| R3 | 9-11 | 67.3 | 59.6 | 50.8 |
| R4 | 13-17 | 50.0 | 35.2 | 24.8 |
| R5 | 14-20 | 50.5 | 28.7 | 15.5 |
| R6 | 17-25 | 46.1 | 25.7 | 11.3 |
| R7 | 27-37 | 55.7 | 21.4 | 7.8 |
| R8 | 31-43 | 55.3 | 24.1 | 6.6 |

+PI (20P/3)) formulation, coated on Kraft 185 (ca. GSM) linear board on the shiny side at a range of annealing temperatures and coating weights.

Higher Temperature and Coating Weight with Reduced Glycerol Level

Figure 6:
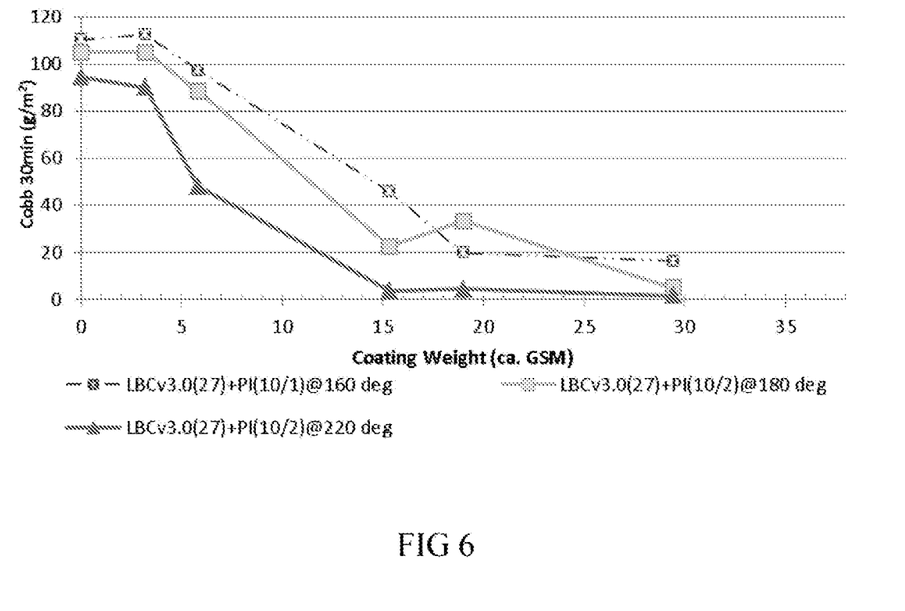
FIG. 6 is a graphical representation of the obtained Cobb values of a lignin and 10% glycerol containing formulation coated onto linerboard at different coating application weights and annealing conditions (160, 180 and 220° C.)

A 'high thermal optimised formulation' (LBCv3.0 (27)+ PI(10/2)) (60.4% H₂O, 2.9% Ammonia (25%), 2% Latex (61%DS), 10% Glycerol, 24.7% Lignin all w/w) of Brookfield's Viscosity 380-500 (mPa·s), pH 8.8-9, and oven dried solids of 33-34%DS—was coated onto Kraft liner board (ca. 205 GSM) shiny side by drawdown coater. Application was either single or a double coat, Rod 1, Rod 1+Rod 1, Rod 6, Rod 6+Rod 1, Rod 6+Rod 6, duration within annealing oven was 5 min for all Rod 6 applications and 2 min for Rod 1, for temperatures 160, 180 and 220° C. Cobb values of the resulting substrates are shown below in table 8 and are represented graphically in FIG. 6.

TABLE 8

Comparison of Cobb (30 min) for high thermal optimised (LBCv3.0 (27) + PI (10/2)) formulation, coated on Kraft 205 (ca. GSM) linear board on the shiny side at a range of annealing temperatures and coating weights.

| | LBCv3.0(27) + PI(10/2) | Cobb 30 min (g/m2) | | |
|---|---|---|---|---|
| Application Method | Ca. Coating Weight (GSM) | Annealing Conditions (° C.) | | |
| | | 160 | 180 | 220 |
| Control (Kraft 205) | | 110.4 | 105.1 | 94.5 |
| R1 | 2-4 | 112.6 | 105.1 | 90.0 |
| R1 + R1 | 4-7 | 97.4 | 88.4 | 48.2 |
| R6 | 12-18 | 45.8 | 22.5 | 3.7 |
| R6 + R1 | 16-23 | 19.8 | 33.2 | 4.4 |
| R6 + R6 | 20-33 | 16.3 | 5.0 | 1.6 |

90° C. Temperature Treatment and Extended Annealing

Using the same low thermal optimised formulation as prepared for the reduced temperature and coating weight annealing series (LBCv3.0 (27)+PI (20P/3)) (53.1% H20, 2.5% Ammonia (25%), 3% Latex (61%DS), 20% Glycerol, 21.4% Lignin all w/w) of Brookfield's Viscosity 180-320 (mPa·s), pH 8.3-5, and oven dried solids of 32-34%DS. A Kraft liner board (ca. 185 GSM) was coated shiny side by drawdown coater (Rod 7) in a single coat application and annealed within an oven preheated to 90° C. for 3 hours. The annealed coated substrate displayed no transfer of the coating post heavy rubbing and achieved a Cobb (30 min) of 72.7 (g/m2) compared to a Cobb (30 min) of 90.9 for the uncoated control of the same substrate thermally treated in the same fashion demonstrating an increase in liquid water barrier performance.

Annealing Duration Experiments

Figure 7:
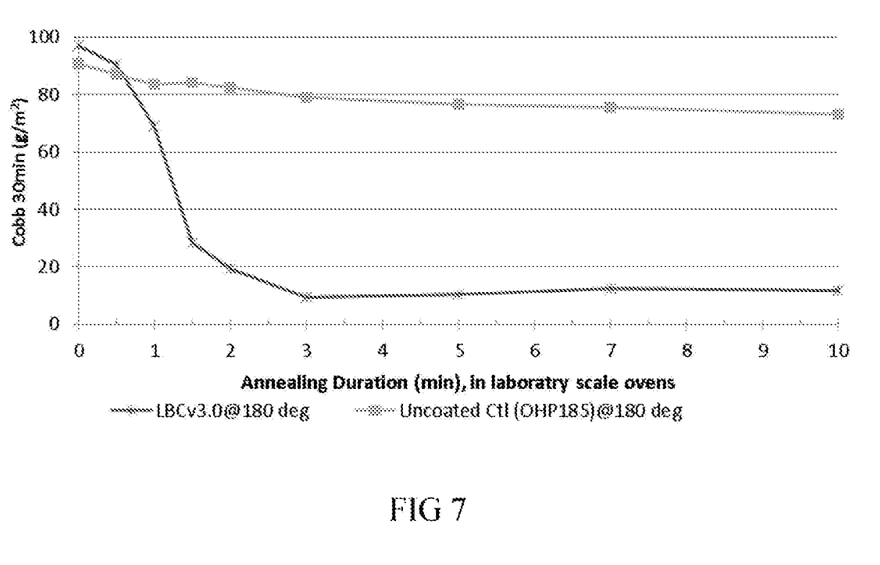
FIG. 7 is a graphical representation of the obtained Cobb values of lignin and 20% glycerol containing formulation coated onto linerboard with varying annealing duration.

Time trial optimised formulation (LBCv3.0 (29)+PI (20P/3)) (51.3% H20, 2.7% Ammonia (25%), 3% Latex (61%DS), 20% Glycerol, 23.0% Lignin all w/w) of Brookfield's Viscosity 600-900 (mPa·s), pH 8.1-8.9, and oven dried solids of 36-40%DS. A Kraft liner board (ca. 185 GSM) was coated shiny side by drawdown coater (Rod 6) in a single coat application and annealed within an oven preheated to 180° C. for 0, 0.5, 1, 1.5, 2, 5, 7 and 10 minutes. The results are indicated in table 9 and FIG. 7.

In the laboratory scale ovens used, the substrate required ca. 3 min for the coated surface to reach the target annealing conditions (180° C.). This is also the apparent point of optimal performance in terms of annealing duration with limited performance increase for extended durations tested. It is appreciated that in commercial scale heating equipment, the time required for a substrates surface to reach the target annealing conditions will be far quicker and typically in the order of seconds.

TABLE 9

Comparison of Cobb (30 min) for optimised (LBCv3.0 (29) + PI (20P/3))

| Liquid Water Barrier | Annealing Duration (min) @ 180° C. | | | | | | | |
|---|---|---|---|---|---|---|---|---|
| (Cobb 30 (min) (g/m2)) | 0* | 0.5 | 1 | 1.5 | 2 | 3 | 5 | 7 | 10 |
| LBCv3.0(29) + PI(20P/3) + OHP185_S Rod 6 | 97 | 91 | 69 | 29 | 19 | 9 | 10 | 13 | 12 |
| Uncoated Control (OHP185) | 91 | 87 | 83 | 84 | 82 | 79 | 76 | 75 | 73 |

*'0' min = No Annealing treatment and ambient drying (23 deg, 50% RH). Max thermal treatment at 37 deg during standard preconditioning.

formulation, coated on Kraft 185 (ca. GSM) linear board on the shiny side with varying annealing duration.

Formulation of Low Thermal Optimised Formulation (LBCv3.0 (27)+PI (20P/3))

Into ambient reactor (screw top Erlenmeyer—500 mL) add 132/5 g DI H₂O and 6.28 g of NH₃ (25%). Mix by gentle swirling creating a 0.69 M NH₃ solution. Further add 7.5 g of latex (61%DS) and 50 g glycerol. Place reactor into Gyratory Water Bath Shaker and start heat (high) with set point 90 deg and orbital agitation (low speed). Blend with 53.47 g of sieved (600 μm) raw lignin PB1k (13) 2.8%MSTR) for a total formulation of 250 g. Continue until homogenous and internal formulation above 80 deg (ca. 1-2 hr). Sieve (600 μm) while hot, V·min/no fines should be present.

Formulation of High Thermal Optimised Formulation (LBCv3.0 (27)+PI (10/2))

Into ambient reactor (screw top Erlenmeyer—500 mL) add 151.07 g DI H₂O and 7.24 g of NH₃ (25%). Mix by gentle swirling creating a 0.7 M NH₃ solution. Further add 5 g of latex and 25 g glycerol. Place reactor into Gyratory Water Bath Shaker and start heat (high) with set point 90 deg and orbital agitation (low speed). Blend with 61.68 g of sieved (600 μm) raw lignin PB1k (13) 3.7%MSTR) for a total formulation of 250 g. Continue until homogenous and internal formulation above 80 deg (ca. 1-2 hr). Sieve (600 μm) while hot, V·min/no fines should be present.

Formulation for Reduced Temperature Annealing (LBCv3.0 (29)+PI (20P/3))

Into a reactor add 900 kg of water (deionized) and 54 kg of aqueous ammonia (25% NH3) while stirring at ambient temperature. Add 60 kg of natural latex (61%DS) and continue stirring. Add 400 kg of Glycerol (BP), continue stirring. Begin heating reactor to 50° C. and begin adding lignin 460 kg of raw lignin PB1k (13) (2.8%MSTR).Wash the inside of reactor walls with a further 127 kg of water (deionized). Close reactor and heat to greater than 80° C. and then continue to stir for at least 1 hour under reflux. The final formulation should be ca. 36-40% DS, pH ca. 8.1 to 8.9 and Brookfield's viscosity of 600-900 cP at ambient (ca. 23 deg).

The results shown for the experiments using 20% and 10% of glycerol, respectively, indicate the success of the approach whereby glycerol is used to achieve similar Cobb values with a reduction in the required annealing temperatures. Thus, while the use of glycerol is not essential to the present invention it is preferred in terms of the reduced temperature requirement and the quality of the waterproof film that is formed.

The present invention thus provides for excellent quality waterproof and/or strengthening coatings based on compositions which contain only lignin as the sole active waterproofing and/or strengthening agent. The transformation of the lignin into a preferred state which provides surprisingly effective waterproofing and/or strengthening properties on the substrate is achieved by either a thermal annealing at temperatures above about 160° C. or by an acid treatment step. Such a simple formulation is easily handled, requires minimal manipulation in terms of optimising pH, viscosity and the like and is extremely cost effective due to the simplicity of the active ingredients and the wide availability of lignin.

The above description of various embodiments of the present invention is provided for purposes of description to one of ordinary skill in the related art. It is not intended to be exhaustive or to limit the invention to a single disclosed embodiment. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention.

In the claims which follow and in the preceding description of the invention, except where the context clearly requires otherwise due to express language or necessary implication, the word "comprise", or variations thereof including "comprises" or "comprising", is used in an inclusive sense, that is, to specify the presence of the stated integers but without precluding the presence or addition of further integers in one or more embodiments of the invention.

The invention claimed is:

1. A method of forming a coating on an external surface of a formed substrate including the steps of:
   (a) forming a lignin solution by at least partially dissolving a lignin in an alkaline solution, wherein the lignin is not a lignosulfonate lignin and wherein the lignin solution consists essentially of lignin, glycerol and plasticiser as the only non-solvent components;
   (b) coating the lignin solution onto the external surface of the formed substrate; and
   (c) exposing the lignin coated substrate to a treatment selected from the group consisting of a heat treatment and an acid treatment,
   to thereby form a coating on the external surface of the formed substrate.

2. The method of claim 1 wherein the substrate is selected from the group consisting of lignocellulosic substrates, lignocellulosic derived substrates, cellulosic substrates and cellulosic derived substrates.

3. The method of claim 1 wherein the alkaline solution is an aqueous alkaline solution.

4. The method of claim 1 wherein the lignin solution consists essentially of lignin as an active waterproofing and/or strengthening agent.

5. The method of claim 1 wherein the % by weight amount of the glycerol in the lignin solution is between 1 to 30%.

6. The method of claim 1 wherein the plasticiser is present in the lignin solution in a % by weight amount of between 0.1% to 10%.

7. The method of claim 1 wherein the pH of the lignin solution at coating is between about 7.0 to 9.5.

8. The method of claim 1, wherein the acid treatment comprises contacting the lignin coating with an acid having a pH below 4.0.

9. The method of claim 1, wherein the alkaline solution is an ammonia solution.

10. A method of forming a coating which remains on substantially only an external surface of a formed substrate including the steps of:
    (a) forming a lignin solution by at least partially dissolving a lignin in alkaline solution, wherein the lignin is not a lignosulfonate lignin and wherein the lignin solution consists essentially of lignin, glycerol and a plasticiser as the only non-solvent components;
    (b) coating the lignin solution onto the external surface of the formed substrate; and
    (c) exposing the lignin coated substrate to a treatment selected from the group consisting of a heat treatment at a temperature of between 120° C. to 240° C. and an acid treatment,
    to thereby form a coating which remains on substantially only an external surface of the formed substrate.

11. The method of claim 10, wherein the substrate is selected from the group consisting of lignocellulosic substrates, lignocellulosic derived substrates, cellulosic substrates and cellulosic derived substrates.

12. The method of claim 10, wherein the alkaline solution is an aqueous alkaline solution.

13. The method of claim 10, wherein the lignin solution consists essentially of lignin as an active waterproofing and/or strengthening agent.

14. The method of claim 10, wherein the % by weight amount of the glycerol in the lignin solution is between 1 to 30%.

15. The method of claim 10, wherein the plasticiser is present in the lignin solution in a % by weight amount of between 0.1% to 10%.

16. The method of claim 10, wherein the pH of the lignin solution at coating is between about 7.0 to 9.5.

17. The method of claim 10, wherein the acid treatment comprises contacting the lignin coating with an acid having a pH below 4.0.

18. The method of claim 10, wherein the alkaline solution is an ammonia solution.

19. A method of forming a coating which remains on substantially only an external surface of a formed substrate including the steps of:
    (a) forming a lignin solution, wherein the lignin is the major active waterproofing and/or strengthening agent, and is present in the solution at greater than 50% by weight of active waterproofing and/or strength enhancing elements, by at least partially dissolving a lignin in an alkaline solution and wherein the lignin is not a lignosulfonate and the lignin solution consists essentially of lignin, glycerol, and a plasticiser as the only non-solvent components;
    (b) coating the lignin solution onto the external surface of the formed substrate; and
    (c) exposing the lignin coated substrate to a treatment selected from the group consisting of a heat treatment at a temperature of between 120° C. to 240° C. and an acid treatment,
    to thereby form a coating which remains on substantially only external surface of the formed substrate.

* * * * *